Dec. 20, 1960 H. L. BROWNBACK 2,965,419
FILTERING AND NON-SEIZING BEARING
Filed May 28, 1954

INVENTOR:-
Henry Lowe Brownback
By Alexander Howell
ATTORNEYS

United States Patent Office 2,965,419
Patented Dec. 20, 1960

2,965,419

FILTERING AND NON-SEIZING BEARING

Henry Lowe Brownback, Reach Road, Deer Isle, Maine

Filed May 28, 1954, Ser. No. 433,183

3 Claims. (Cl. 308—122)

Motor bearings can be divided into two general classifications, namely those having a bearing surface composed of a relatively soft metal, such as the various tin alloys and the various lead alloys, and those having a surface composed of a relatively hard metal, such as the various copper lead mixtures, bronzes, aluminium alloys and silver alloys. Some of these latter may be coated with a few thousandths of a millimeter of lead, tin, tin-lead, indium or other metal as a protection from corrosion, but this cannot be counted as the actual bearing surface.

While the harder metals mentioned as bearing surfaces either plane or the protected type, will sustain loads which would soon destroy the softer metal types, they have one general weakness in that if the lubricant is not absolutely clean or if any foreign matter gets between the bearing surface and the shaft upon which it bears, both the bearing and the shaft will be cut, while, on the other hand, when the softer metals are used the dirt, or other hard particles, will imbed themselves in the soft bearing metal and thus protect the shaft from scratching and the bearing surface from cutting.

In most modern machines in which these bearings are used and particularly the crankshafts of internal combustion engines, oil is fed to the inside of the bearing surface through a hole in the shaft with the lubricant under sufficient pressure to ensure a supply between the shaft and the bearing and, also, to pass enough lubricant to effectively cool the bearing.

Bearings are generally made of a steel or other strong metal, backed with the bearing surface of another metal bounded thereto by various processes. However, some of the brasses, bronzes and aluminium alloys have sufficient mechanical strength to be cast or taken from the mass.

In order to protect bearings, and particularly those with hard type bearing surfaces, from dirt, lubricant filters are usually used to filter out all particles of dirt of any kind, very fine filters sometimes filter too well and filter out additives which have been put in the lubricant to increase its lubricating qualities, its viscosity index, its ability to resist oxidation, its ability to resist foaming, to act as a detergent, etc. Naturally, when additives are found necessary in a lubricant to give it the working qualities for its proper functioning, it becomes an inferior product, therefore great care must be used in getting oil filters which are not too efficient, also, careless operation or a lubricant which gives off products which tend to block the filter element or the use of a detergent in a dirty engine may cause the lubricant to by-pass the filter in an unfiltered or partly unfiltered condition and the dirt in the lubricant may get to a bearing surface and start trouble.

The trouble seems particularly prevalent in some diesel engines and particularly in the connecting rod bearings, as some manufacturers build engines which have a bearing of the hard surface type on the connecting rod to carry the explosion load and a soft metal surface in the bearing cap to carry part of the inertia load of the piston and connecting rod and to filter the dirt out of the oil by allowing the dirt to imbed itself in the soft metal half. This is only partly effective because in any case the dirt passes over the hard metal surface before being collected in the soft metal surface and, also, as engine speeds increase inertia forces build up until they equal and then surpass the explosion forces. When this condition or any thing even approaching it occurs, the soft metal will wear or fail just as it would in an all-soft metal bearing.

This invention allows the use of a hard metal surfaced bearing and at the same time gives the protection of the soft metal bearing. It has also another quality which can protect the shaft and the bearing from a sudden gripping failure. The thing which makes copper-lead or high lead bronze such an effective bearing metal is not only the fact that finely divided lead held in a copper or bronze matrix forms the bearing surface but that, in case of a temporary or a sudden failure in the supply of lubricant, the bearing will heat but instead of gripping as copper or bronze would part of the lead will melt, sweat out to the bearing surface and lubricate it temporarily, which may avoid a grave accident. In the same manner, a bearing fitted too tightly will heat and sweat lead which will avoid a sudden seizure. The other hard metals have no lead and, therefore, seize as soon as there is an oil supply failure.

The present invention gives the same protection to these other hard metal bearings and the shafts upon which they run as copper lead and high lead bronze gets from the lead they contain and in case of copper leads or lead bronze will greatly increase this protection.

According to the invention the bearing, which may be constituted of two half shells secured opposite one another, comprises an inner bearing surface of hard metal provided with grooves the location of which corresponds to the path of the lubricant, these grooves being filled with soft metal in the mass of which the particles carried by the lubricant imbed, thus preventing any scratching or damaging of the shaft on which the bearing is mounted.

In the method according to the invention for the manufacture of bearings of the kind mentioned above, the body made of steel, for instance, of the bearing is coated with a hard metal lining, grooves are formed in said lining, then said grooves are filled with a soft metal and the final finish operations of the bearing surface are performed so that the soft metal appears as inlays.

Various other characteristics of the invention appear from the following detailed description and claims.

One form of embodiment of the invention is represented, by means of non limitative example, in the appended drawings.

To render clearer the following description, a bearing for a connecting rod of an internal combustion engine is described hereinafter; however, the invention concerns also any other kinds of bearings, it being possible to use the bearing manufactured according to the method of the invention in numerous applications.

Figure 1:
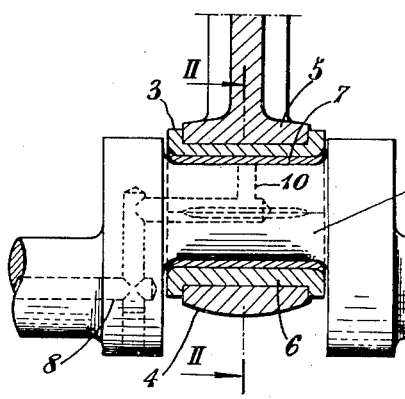
Figure 1 shows, in longitudinal cross-section, a bearing of the connecting rod of an internal combustion engine.

In Figure 1, 1 designates a crankshaft on the crank pin on which is mounted a bearing 3 carrying the head 4 of a connecting rod 5.

Figure 2:
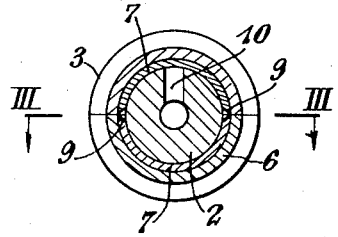
Figure 2 is a cross section taken along line II—II of Figure 1.

The bearing 3 comprises, in the usual manner as shown in Figure 2, a steel body 6, connected to the connecting rod 5 and an inner metallic lining 7 surrounding the crank pin 2. The whole assembly is lubricated by means of a curved conduit 8 bored according to the axis of the crankshaft 1 and communicating with a radial conduit 10, opening between the crank pin 2 and the inner wall of the lining 7 which is provided with grooves 9 for the circulation of the lubricant.

Figure 3:
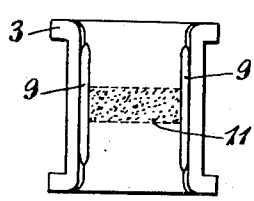
Figure 3 is a plan view of the lower portion of the bearing of Figure 1 taken along line III—III of Figure 2 and showing the path of the lubricant.
Figure 5:
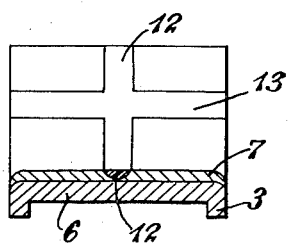
Figure 5 shows the bearing partly in cross-section.

When the lubricant is brought by conduits 8 and 10, it passes between the crank pin 2 and the lining 7 substantially along a path shown at 11 in Figure 3, then this lubricant enters one of the grooves 9 from which it flows across the entire width of the crank pin. Dust, metal particles or other foreign matter in suspension in the lubricant also follow the path 11 then are axially driven with the forced out lubricant along the crank pin 2. Due to this fact, the bearing and the crank pin or shaft risk being cut and/or scratched.

Figure 4:
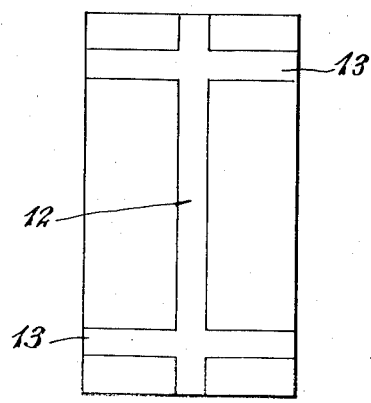
Figure 4 shows in developed position and in enlarged scale the inner surface of a bearing manufactured according to the invention.

In Figure 4, which shows an example or embodiment of the invention, the hard metal lining constituting the bearing surface of the bearing is shown developed and has its inner face provided with a longitudinal groove 12 and two transversal grooves 13 which are milled out or bored in any other convenient manner before the final finish operations are performed on the bearing. The grooves 12 and 13 have a depth substantially equal or preferably slightly less than the thickness of the hard metal lining 7. In the case of the bearinges which are not provided with linings, the depth of the grooves corresponds to that of the grooves of bearings with inner linings.

It must be understood however, that the paths milled out and referenced 12, 13 may be used in combination as shown or singly or in any necessary number.

The paths 12, 13 are filled with lead, tin or alloys thereof or some other soft bearing metal so that when finished the surface of the soft metal corresponds exactly to that of the hard metal. In fact, the soft metal forms practically an inlay in the hard metal.

In this manner, as the lubricant comes into the bearing, it takes a path along one soft metal inlay and if the axial inlays are used it takes a path across these inlays.

The particular structural feature of the bearing described above results in the hard metal surface supporting the load and the soft metal inlay bearing equally on the shaft. Due to this fact, the dirt or metal particles which may have escaped the oil filter and which are in suspension in the oil penetrate the surface of the soft metal which prevents scratching or seizing of the shaft and acts in fact as a supplementary filter.

The soft metal inlays have the further quality of protecting the shaft and preventing seizing of the bearing, in case of overheating, by melting and spreading on the surface. Furthermore, a solid lubricant may be incorporated in the soft metal to increase the quality mentioned above of protecting in case of overheating.

This invention is not limited to the form of embodiment shown and described in detail, as various modifications may be made thereto within its scope. In particular, the number and the shape of the inlays of soft metal may be different from those mentioned above. It is possible to use only an annular inlay or only axial inlays or various other combinations.

I claim:

1. In a device comprising a shaft provided with at least a radial hole used for forcing out a lubricant and a bearing mounted on said shaft, a hard metal lining covering the inner wall of said bearing to form a bearing surface, said lining being provided with at least one groove opposite the opening of said hole, a soft metal filling said groove and rising to the level of said lining so that the lubricant flows along said soft metal which acts as a filter to retain particles carried by the lubricant in preventing any scratching or damaging of the hard metal bearing surface and of the shaft.

2. In the association of the crankshaft and of the connecting rod of an internal combustion engine, said crankshaft being shaped to form bored crank pins through which lubricant is forced out for lubricating and cooling said crankshaft and connecting rod, bearings comprising hard metal bearing surfaces, said surfaces being provided with annular grooves intersecting the opening of the bore by which the lubricant is forced out, sets of grooves intersecting said annular grooves and extending across the entire length of said bearing and a soft metal comprising one or more of the group consisting of lead, tin, tin lead, indium, and alloys thereof filling said annular grooves and said sets of grooves intersecting the latter so as to form inlays corresponding with the path along which the lubricant flows.

3. In the association of the crankshaft and of the connecting rods of an internal combustion engine, said crankshaft being shaped to form bored crank pins through which lubricant is forced out for lubricating and cooling said crankshaft and said connecting rods, bearings comprising hard metal bearing surfaces in contact with said crank pins, said surfaces being provided with annular grooves intersecting the openings of the bores by which the lubricant is forced out, sets of grooves intersecting said annular grooves and extending across the entire length of said bearings and a soft metal including a solid lubricant filling said annular grooves and said sets of grooves intersecting the latter so as to form inlays located opposite the path along which the lubricant flows.

References Cited in the file of this patent

UNITED STATES PATENTS

| | | |
|---|---|---|
| 1,153,647 | Smalley | Sept. 14, 1915 |
| 1,354,852 | Schneider | Oct. 5, 1920 |
| 1,637,317 | Shoemaker | July 26, 1927 |
| 1,941,768 | Vigne | Jan. 2, 1934 |
| 2,544,913 | Brantingham | Mar. 13, 1951 |
| 2,615,768 | Schluchter | Oct. 28, 1952 |